United States Patent [19]

Kingsley

[11] 4,346,984
[45] Aug. 31, 1982

[54] DOCUMENT SCANNER

[75] Inventor: William Kingsley, Rochester, N.Y.

[73] Assignee: Xerox Corporation, Stamford, Conn.

[21] Appl. No.: 198,392

[22] Filed: Oct. 20, 1980

[51] Int. Cl.³ .................... G03G 15/28; G03B 27/38
[52] U.S. Cl. .......................................... 355/8; 355/58
[58] Field of Search ................ 355/3 R, 8, 11, 55, 355/58, 59

[56] References Cited

U.S. PATENT DOCUMENTS

| | | | |
|---|---|---|---|
| 3,029,660 | 4/1962 | Sears | 74/424.8 |
| 3,369,414 | 2/1968 | Helck | 74/89 |
| 3,422,696 | 1/1969 | Valenti | 74/424.8 |
| 3,659,473 | 5/1972 | Rongved | 74/424.8 R |
| 3,752,558 | 8/1973 | Lloyd | 350/6 |
| 3,775,008 | 11/1973 | Schaeffer et al. | 355/18 |
| 3,788,640 | 1/1974 | Stemmle | 271/64 |
| 3,987,681 | 10/1976 | Keithley et al. | 74/89.15 |
| 4,093,374 | 6/1978 | Zucker et al. | 355/57 |
| 4,110,028 | 8/1978 | Schneider | 355/8 |
| 4,120,578 | 10/1978 | Daniels | 355/8 |
| 4,142,793 | 3/1979 | Schilling | 355/58 |
| 4,149,090 | 4/1979 | Aguinek | 250/566 |
| 4,155,641 | 5/1979 | Sagara et al. | 355/8 |

OTHER PUBLICATIONS

Theory of Operation of the 4000 Service Manual Xerox Corporation, Rochester, NY.

*Primary Examiner*—Fred L. Braun

[57] ABSTRACT

A lead screw is provided to move two or more document scanning elements at separate and differing rates of speed. In a preferred embodiment the lead screw consists of two threaded segments, each segment having a length and pitch which provides a 2:1 ratio of travel to a scan element threadingly engaged therein.

6 Claims, 2 Drawing Figures

DOCUMENT SCANNER

BACKGROUND AND PRIOR ART STATEMENT

This invention relates to an optical scanning system for scanning the information content of an original document and, more particularly, to a scanning system which employs a screw type driving means to simultaneously move a plurality of scanning elements at different rates of speed.

In the copying art, relatively compact copiers such as the Xerox 3100 have been made possible by using dual rate scanning techniques to shorten the optical path. Typically, these systems, as shown in U.S. Pat. Nos. 3,832,057 and 4,155,641, utilize scanning elements which are mounted on carriages and driven horizontally beneath a platen to scan successive incremental areas of a document on the platen. Each scan carriage, typically driven by a pulley-gear arrangement operating off the photoreceptor drive, travels at a different rate of speed (1:½) so as to maintain the required total conjugate length. The scanned images are then projected through a lens onto the photoreceptor surface.

These dual rate optical scan systems have several attendant disadvantages. They require a complex cable drive system with difficult-to-achieve pulley and gear ratios. Cable tensioning must be accurately set up and maintained. Acceleration and deceleration effects contribute to unwanted carriage side movements resulting in skipped or blurred images.

There are additional prior art systems which would benefit from a more efficient dual rate scan system. For example, in raster scanning systems, the original document is scanned and the line images projected onto image arrays, typically CCD elements. Each of the arrays produce a stream of discrete video signals representative of the image being scanned.

In this type of screw system, extremely precise control of the scan mechanism is required because of the narrow exposure "window" of the image arrays. The pulley system described above is not precise enough to realize the exacting screw requirements. One alternative known in the art is to mount the scan carriage on a lead screw as is disclosed in U.S. Pat. No. 4,149,090 and in co-pending U.S. application Ser. No. 084,202, filed Oct. 12, 1979, now abandoned, assigned to the same assignee as the present application. The pitch of the lead screw can be machined to provide a precisely defined rate of travel of the scan carriage. This solution, however, requires the simultaneous movement of additional optical elements; e.g. folding mirrors, lens, beamsplitters.

SUMMARY

According to the present invention there is provided a scanning drive means which may be utilized in a copier dual rate scan system to provide a simple, more exact drive system. This drive means may also be advantageously used in a raster scan system to provide the precise control required to image line segments onto image arrays.

The scanning drive means comprises a lead screw which has at least two threaded portions along its length, each portion having its own unique pitch. Each pitch is designed to provide a separate rate of travel for scan elements which are threadingly engaged thereon. In an exemplary embodiment, this lead screw can be provided with two segments, the first having a pitch will provide a first rate of travel to a full rate scan carriage mounted thereon and a second having a pitch which provides a second rate of travel half that of the first rate to a half rate scan carriage. Since each segment can be very precisely machined, the critical tolerance required for raster scanning systems can be obtained, and since the dual rate scanning maintains the correct total conjugate, additional imaging elements can be designed to remain fixed within the optical system.

DRAWINGS

DESCRIPTION

Figure 1:
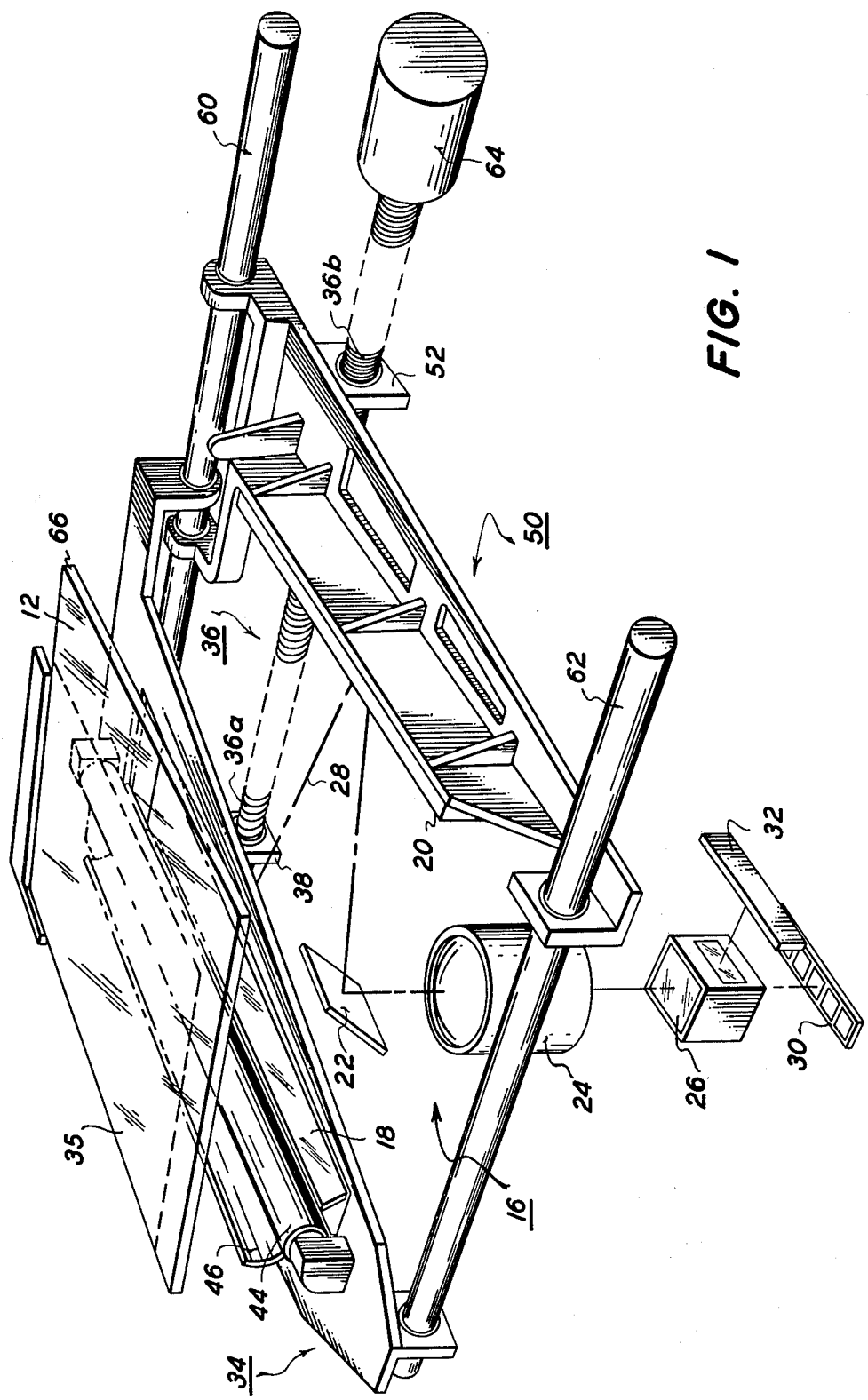
FIG. 1 is a perspective view of a dual rate raster scanning system which shows a dual pitch lead screw driving the scan elements.

Although the drive means of the present invention can be used in a variety of document scanning applications, it is herein described for illustrative purpose as used in the raster scan type system of FIG. 1.

Referring to FIG. 1, scanning of a flat original document supported on platen 12 is accomplished by optical system 16. The optical system comprises a full rate scanning mirror 18, a half rate mirror 20, folding mirror 22, fixed lens 24 and beamsplitter mirror 26. These elements cooperate to form an optical path 28 through which image rays reflected from a document are transmitted to arrays 30, 32.

Scanning mirror 18 is supported on carriage 34 and extends transversely across the platen surface in substantially parallel alignment with the platen start of scan margin 35. Carriage 34 is adapted to move back and forth over a prescribed horizontal path of travel below the platen surface and at a first rate of speed. To this end, carriage 34 is treadingly engaged with a first segment 36a of drive screw 36 by means of flexure nut 38. The pitch of segment 36a has been designed to provide a first desired rate of travel to the carriage engaged thereon.

Mounted on carriage 34 directly behind scanning mirror 18 is apertured elongated lamp 44 and reflector 46. These two elements cooperate to illuminate a longitudinally extending incremental area upon the platen within the viewing domain of the scanning mirror.

A second movable carriage 50 is also provided upon which is supported the half rate mirror 20. Carriage 50 is threadingly engaged with a second segment 36b of screw 36 by means of flexure nut 52. The pitch of segment 36b has been designed to provide a second rate of travel to carriage 50 which is exactly one half the rate at which carriage 34 is driven.

The outboard and inboard sides of both carriage 34 and 50 are adapted to slide freely along guide rails 60 and 62, respectively.

In operation, and at a start of scan, servo motor 64 causes lead screw 26 to rotate in a clockwise (scan) direction. Each carriage begins to move beneath the platen at its predetermined rate. Light from exposure lamp 44 illuminates successive scan lines across the width of the platen. These lines are reflected from mirrors 18 and 20 and folded by mirror 22 so as to enter lens 24. Lens 24 is fixedly mounted in a substantially central location in a preset spaced opposing relationship to arrays 30, 32. The lens projects the line images onto mirror 26 which has two facets disposed at predetermined angles with respect to one another such that the mirror serves as an object beamsplitter to split the projected image into two images, one for each array 30, 32. Each array comprises internal photosensitive or viewing elements which extend longitudinally thereof to form a narrow viewing window. Each of the arrays produce a stream of discrete video signals representative of the image line scanned, the arrays being disposed so that the array viewing fields overlap to provide an uninterrupted scan line. The further processing of these video signals is well known in the art.

The scan cycle continues until the end of scan margin 66 is reached at which time servo motor 64 reverses the rotation of screw 26 and drives the carriage back to the start of scan position generally at a faster rate of speed. Control of the servo motor and the image array precessing are functions which can be controlled by well known microprocessor techniques.

In the system shown, alternate locations may be preferred for lead screw 36 depending on factors such as the mass of the moving scan elements. For example, the screw may be moved closer towards the outboard side of the carriage just outside the scanning domain. It is also desirable in some systems to begin the scan cycle, i.e. move the scan elements, beginning at some point preceding the start of scan margin and end at some point past the end of scan margin. This would eliminate the undesirable effects of rapid acceleration and deceleration at the beginning and end of scan.

Figure 2:
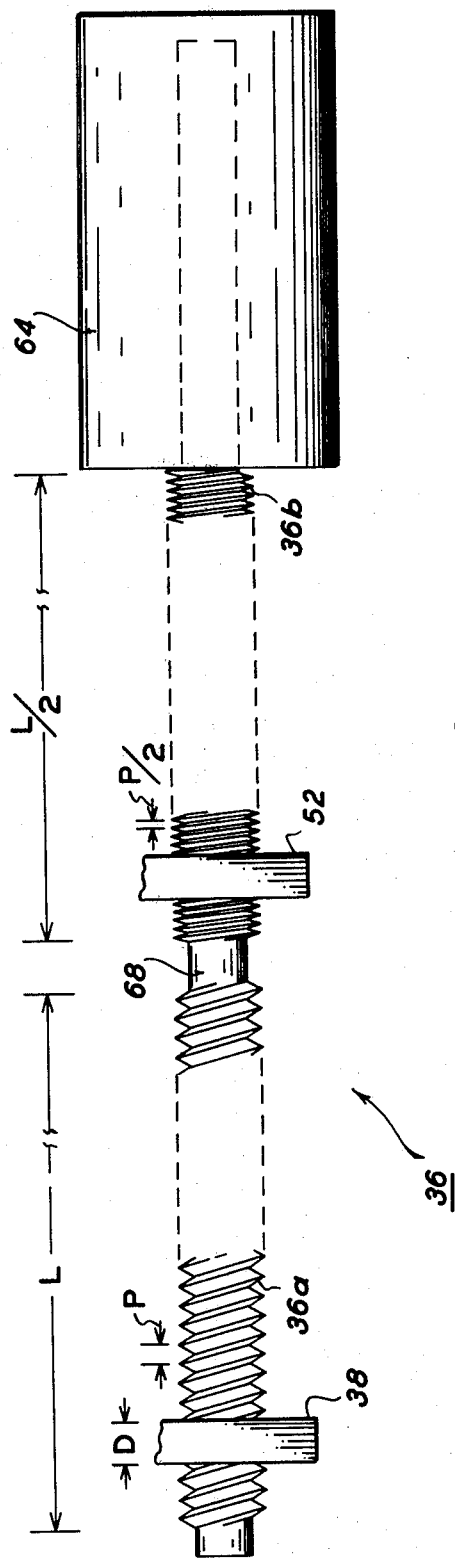
FIG. 2 is an enlarged view of the dual pitch lead screw of FIG. 1 showing the greater detail the pitch of the threaded segments as well as the mount engagement.

FIG. 2 shows, in an enlarged view, a portion of the mounting-drive arrangement of carriages 34 and 50 to lead screw 36. Lead screw 36 consists of two separate threaded segments 36a and 36b which are engaged by anti-backlash flexure nuts 38 and 52. Section 36a has a length L cm which is twice that of segment 36b and a pitch P cm/sec twice that of segment 36b. Each carriage 34 and 50 is therefore driven at a velocity $V = RP$/cm/sec where R is the speed of servo motor 56 in revolutions/sec. As a result of the pitch selections, carriage 34 will be driven at a first velocity while carriage 50 is driven at a second velocity $V/2$.

It is, of course, obvious that different relative speed ratios can be obtained simply by changing one or both pitches.

Screw 36 can be of stainless steel construction with segments 36a and 36b, separately roll threaded and joined together at juncture segment 68. Flexure nuts 38 and 52 can be of plastic construction to provide a non-rigid mating connection. The width D of the driving nuts may be made larger to provide greater stability to the driving interface. Also, the diameter of segment 36b may be made smaller than that of segment 36a to reduce system inertia.

Although the scanning system disclosed herein described a full rate, half rate mirror, other speed ratios are contemplated within the purview of the invention; and, while two threaded segments have been shown, three or more threaded segments, each with their separately designed pitch, may be required for specific applications. It is also appreciated that although the invention was disclosed within the context of a raster scanning system, it can also be used in a copier wherein the line images are projected onto a photoreceptor drum or belt rather than the image arrays of FIG. 1.

What is claimed is:

1. An optical scanning system having at least two mirror assemblies mounted for independent movement beneath a document lying in an object plane, the scanning system further comprising means for driving said assemblies at different rates of speed, said driving means including a lead screw having along its length at least two threaded segments having a pitch differing one from the other, said mirror assemblies being each threadingly engaged with a separate threaded segment, and means for rotating said lead screw whereby each mirror assembly is advanced along said threaded segment at a rate of speed proportional to the velocity of said rotating means and the pitch of the respective threaded segment.

2. The optical scanning system of claim 1 wherein a first mirror assembly scans the document and reflects the scanned image to a second mirror assembly, said second assembly being threadingly engaged to a lead screw segment having a pitch V2 of the pitch of the segment upon which the first mirror assembly is threadingly engaged.

3. A scanning system for incrementally scanning a document in an object plane, the system comprising
a full rate scan mirror and a half rate mirror mounted respectively for independent movement on a first and second movable carriage disposed beneath said object plane,
a lead screw having along its length a first threaded segment with a pitch P cm/rev and a second threaded segment with a pitch P/2/cm/rev,
means for threadingly engaging said first carriage with said first threaded segment and said second carriage with said second threaded segment, and
means for rotating said lead screw whereby each carriage is advanced along the respective shaft segment at a rate of speed proportional to the velocity of said rotating means and the respective segment pitch.

4. The scanning system of claim 3 wherein said threadingly engaging means is a flexure nut.

5. The scanning system of claim 3 wherein said first and second threaded segments have different diameters.

6. The scanning system of claim 3 wherein scanned line images are transmitted along an optical path wherein a lens and beamsplitter mirror cooperate to project said line images onto photosensitive imaging arrays.

* * * * *